US012776541B2

(12) United States Patent
Chen et al.

(10) Patent No.: US 12,776,541 B2
(45) Date of Patent: Oct. 27, 2026

(54) ENERGY STORAGE DEVICE

(71) Applicant: Contemporary Amperex Technology (Hong Kong) Limited, Hong Kong (CN)

(72) Inventors: Xing Chen, Ningde (CN); Hua Zhang, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 19/071,788

(22) Filed: Mar. 6, 2025

(65) Prior Publication Data

US 2025/0202006 A1 Jun. 19, 2025

Related U.S. Application Data

(63) Continuation of application No. PCT/CN2023/129957, filed on Nov. 6, 2023.

(30) Foreign Application Priority Data

Nov. 10, 2022 (WO) ................ PCT/CN2022/131208
Apr. 6, 2023 (CN) ......................... 202320742804.3

(51) Int. Cl.
*H01M 10/00* (2006.01)
*H01M 10/42* (2006.01)
(Continued)

(52) U.S. Cl.
CPC ......... *H01M 50/24* (2021.01); *H01M 10/425* (2013.01); *H01M 10/613* (2015.04); *H01M 10/6567* (2015.04); *H01M 50/251* (2021.01); *H01M 50/262* (2021.01); *H01M 50/691* (2021.01)

(58) Field of Classification Search
CPC .. H01M 50/24; H01M 10/425; H01M 10/613; H01M 10/6567; H01M 50/251; H01M 50/262; H01M 50/691
See application file for complete search history.

(56) References Cited

U.S. PATENT DOCUMENTS

2002/0179552 A1 12/2002 Marraffa
2014/0134460 A1 5/2014 Youn
(Continued)

FOREIGN PATENT DOCUMENTS

AU 2021231265 A1 4/2022
AU 2021230247 A1 5/2022
(Continued)

OTHER PUBLICATIONS

Machine translation of CN 213959048, obtained Apr. 2025 (Year: 2021).*

(Continued)

*Primary Examiner* — Nicholas P D'Aniello
(74) *Attorney, Agent, or Firm* — XSENSUS LLP

(57) ABSTRACT

An energy storage device is provided, including: a control box arranged in a first compartment of the energy storage device; and a baffle arranged in the first compartment, located above the control box, and covering the control box. Therefore, the performance stability of the energy storage device can be enhanced.

16 Claims, 8 Drawing Sheets

(51) Int. Cl.

| | |
|---|---|
| ***H01M 10/613*** | (2014.01) |
| ***H01M 10/6567*** | (2014.01) |
| ***H01M 50/24*** | (2021.01) |
| ***H01M 50/251*** | (2021.01) |
| ***H01M 50/262*** | (2021.01) |
| ***H01M 50/691*** | (2021.01) |

(56) References Cited

U.S. PATENT DOCUMENTS

| | | | | |
|---|---|---|---|---|
| 2016/0234963 | A1* | 8/2016 | Shah | H05K 7/186 |
| 2016/0285138 | A1 | 9/2016 | Liu et al. | |
| 2021/0013466 | A1 | 1/2021 | Lee et al. | |
| 2021/0313650 | A1* | 10/2021 | Gondoh | H01M 50/35 |
| 2022/0320651 | A1* | 10/2022 | Yang | H01M 10/625 |
| 2025/0046910 | A1* | 2/2025 | Son | H01M 50/204 |

FOREIGN PATENT DOCUMENTS

| | | | | |
|---|---|---|---|---|
| CN | 207624761 | U | 7/2018 | |
| CN | 111953077 | A | 11/2020 | |
| CN | 211980663 | U | 11/2020 | |
| CN | 212587654 | U | 2/2021 | |
| CN | 213959048 | U | 8/2021 | |
| CN | 113540643 | A | 10/2021 | |
| CN | 214625227 | U | 11/2021 | |
| CN | 113812034 | A | 12/2021 | |
| CN | 215680816 | U | 1/2022 | |
| CN | 114142137 | A | 3/2022 | |
| CN | 114207919 | A | 3/2022 | |
| CN | 114221070 | A | 3/2022 | |
| CN | 216145719 | U | 3/2022 | |
| CN | 216354431 | U | 4/2022 | |
| CN | 216406291 | U | 4/2022 | |
| CN | 114614185 | A | 6/2022 | |
| CN | 114678644 | A | 6/2022 | |
| CN | 216698553 | U | 6/2022 | |
| CN | 114696022 | A | 7/2022 | |
| CN | 114927813 | A | 8/2022 | |
| CN | 217182277 | U | 8/2022 | |
| CN | 217426867 | U | 9/2022 | |
| CN | 217427395 | U | 9/2022 | |
| CN | 217606982 | U | 10/2022 | |
| CN | 115395379 | A | 11/2022 | |
| CN | 217740649 | U | 11/2022 | |
| EP | 4007055 | A1 | 6/2022 | |
| JP | 6427707 | B1 | 11/2018 | |
| WO | 2018/128295 | A1 | 7/2018 | |
| WO | WO-2021177761 | A1 * | 9/2021 | H01M 50/691 |
| WO | 2022/065995 | A1 | 3/2022 | |

OTHER PUBLICATIONS

Machine translation of CN 216698553, obtained Jul. 2025 (Year: 2022).*

International Search Report mailed on Dec. 22, 2023, received for PCT Application PCT/CN2023/129957, filed on Nov. 6, 2023, 6 pages including English Translation.

International Search Report mailed on Jun. 14, 2023, received for PCT Application PCT/CN2022/123362, filed on Sep. 30, 2022, 5 pages including English Translation.

International Search Report mailed on Jun. 2, 2023, received for PCT Application PCT/CN2022/131206, filed on Nov. 10, 2022, 5 pages including English Translation.

International Search Report mailed on Dec. 21, 2022, received for PCT Application PCT/CN2022/123432, filed on Sep. 30, 2022, 6 pages including English Translation.

International Search Report mailed on Mar. 22, 2023, received for PCT Application PCT/CN2022/131208, filed on Nov. 10, 2022, 5 pages including English Translation.

International Preliminary Report on Patentability issued Mar. 1, 2025, including Written Opinion issued Jun. 14, 2023, in International Patent Application No. PCT/CN2022/123362 with English translation thereof.

International Preliminary Report on Patentability issued Mar. 1, 2025, including Written Opinion issued Dec. 21, 2022, in International Patent Application No. PCT/CN2022/123432 with English translation thereof.

International Preliminary Report on Patentability issued Mar. 1, 2025, including Written Opinion issued Jun. 2, 2023, in International Patent Application No. PCT/CN2022/131206 with English translation thereof.

International Preliminary Report on Patentability issued Mar. 1, 2025, including Written Opinion issued Mar. 22, 2023, in International Patent Application No. PCT/CN2022/131208 with English translation thereof.

Extended European Search Report issued Aug. 19, 2025 in European Patent Application No. 22960571.2.

Extended European Search Report issued Oct. 13, 2025 in European Patent Application No. 22960570.4.

Extended European Search Report issued Nov. 14, 2025 in European Patent Application No. 23887961.3.

Office Action mailed on May 8, 2026, received for EP Application 22960570.4, 5 pages.

* cited by examiner

ENERGY STORAGE DEVICE

CROSS-REFERENCE TO RELATED APPLICATIONS

This application is a continuation of International Application No. PCT/CN2023/129957, filed on Nov. 6, 2023, which claims priority to International Patent Application No. PCT/CN2022/131208, filed on Nov. 10, 2022, entitled "ENERGY STORAGE DEVICE", which is incorporated herein by reference in its entirety, and this application claims priority to Chinese Patent Application No. 202320742804.3, filed on Apr. 6, 2023, entitled "ENERGY STORAGE DEVICE", each are incorporated herein by reference in its entirety.

TECHNICAL FIELD

This application relates to the technical field of energy storage, particularly to an energy storage device.

BACKGROUND

Currently, for the energy storage device, under the condition that impurities such as liquids, pollutants, or dust from the outside enter the interior of the energy storage device, the normal operation of the energy storage device will be affected. Therefore, how to enhance the performance stability of the energy storage device has become a technical issue that needs to be solved in this field.

SUMMARY

This application provides an energy storage device so as to enhance the performance stability of the energy storage device.

According to a first aspect, an energy storage device is provided and includes: a control box arranged in a first compartment of the energy storage device; and a baffle arranged in the first compartment, located above the control box, and covering the control box.

In this embodiment, the baffle is arranged above the control box in the energy storage device, so that the baffle can cover the control box, that is, an orthographic projection of the control box on the horizontal plane falls within an orthographic projection of the baffle on the horizontal plane, and the baffle can block impurities such as liquids, pollutants, or dust from above the control box from falling onto a surface of the control box, thus protecting the control box, enhancing performance stability of the control box, and ensuring the normal operation of the energy storage device.

In some implementations, the baffle includes a first end and a second end, and the baffle gradually moves away from a bottom of the energy storage device from the first end to the second end.

In this embodiment, along the first end to the second end of the baffle, the baffle gradually moves away from the bottom of the energy storage device, in other words, the baffle is arranged obliquely, so that impurities such as liquids, pollutants, or dust from above the control box can be discharged along an inclined direction of the baffle. For example, these impurities such as liquids, pollutants, or dust can be discharged through the baffle to the bottom of the energy storage device, so that these impurities can be concentratedly treated at the bottom of the energy storage device and discharged to the outside of the energy storage device in time. This can reduce the adverse impact on the control box caused by a lot of impurities accumulated on the baffle, and ensure the normal operation of the energy storage device.

In some implementations, the first compartment includes a first wall and a second wall that face each other in a horizontal direction, where the first end and the second end are respectively connected to the first wall and the second wall.

In this embodiment, the first end and the second end of the baffle are connected to the first wall and the second wall of the first compartment respectively, so that the baffle can be fixed above the control box, thereby enhancing the structural stability of the baffle.

In some implementations, the first end and the second end are distributed along a first direction; and the baffle further includes a third end and a fourth end that are distributed along a second direction, and the baffle gradually moves away from the bottom of the energy storage device from the third end to the fourth end, where the second direction is perpendicular to the first direction.

In this embodiment, the baffle is arranged obliquely in the first direction and also arranged obliquely in the second direction, and the first direction is perpendicular to the second direction, so that a lowest point of the baffle is located at a joint of the first end and the third end, so as to facilitate the movement of impurities such as liquids, pollutants, or dust from above the control box toward the joint of the first end and the third end, thereby achieving directional collection or discharge of impurities, improving the efficiency of treating these impurities, and ensuring the normal operation of the energy storage device.

In some implementations, the baffle is provided with a drainage port, where the drainage port is located at a joint of the first end and the third end. In this way, in this embodiment of this application, compared to other positions of the baffle, the joint of the first end and the third end of the baffle is a region of the baffle closest to a bottom wall of the energy storage device. The drainage port is arranged at the joint of the first end and the third end of the baffle, so that impurities such as liquids, pollutants, or dust from above the control box can be rapidly discharged, ensuring the normal operation of the energy storage device.

In some implementations, an orthographic projection of the drainage port on a horizontal plane falls outside an orthographic projection of the control box on the horizontal plane.

In this embodiment, under the condition that the orthographic projection of the drainage port on the baffle on a horizontal plane falls outside the orthographic projection of the control box on the horizontal plane, impurities flowing through the baffle can be discharged through the drainage port in a direction of gravity of the energy storage device so as to reduce the impact on the performance of the control box. For example, impurities such as liquids, pollutants, or dust from above the control box can be discharged to a partial region of the bottom wall of the energy storage device through the drainage port under the action of gravity and then discharged to the outside of the energy storage device in time. In addition, during the falling process of the impurities, the performance of the control box is not affected, which helps to ensure the normal operation of the energy storage device.

In some implementations, a through hole communicating with the drainage port is provided on a bottom wall of the first compartment. In this way, impurities such as liquids, pollutants, or dust from above the control box can be discharged to the outside of the energy storage device through the drainage port on the baffle and the through hole on the bottom wall of the first compartment in the energy storage device in sequence, so as to reduce the adverse impact of impurities on the control box, enhancing the performance stability of the control box, and ensuring the normal operation of the energy storage device.

In some implementations, the control box is a main control box, a control panel is provided on a side of the main control box, the baffle is arranged obliquely, and an end of the baffle far away from the control panel is inclined toward the bottom of the energy storage device.

In this embodiment, the baffle above the main control box is arranged to be inclined away from an end of a control panel of the main control box and toward the bottom of the energy storage device, so that the adverse impact of impurities such as liquids, pollutants, or dust from above the main control box on the control panel of the main control box can be reduced, the performance stability of the main control box can be enhanced, and the normal operation of the energy storage device can be ensured.

In some implementations, the baffle includes a main body portion and an extension portion that are connected to each other, where the extension portion extends in a direction away from the bottom of the energy storage device. In this way, in this embodiment of this application, the extension portion of the baffle is arranged to extend in the plane of the baffle in the direction away from the bottom of the energy storage device, so that the impact of impurities such as liquids, pollutants, or dust from above the control box flowing from an edge of one end of the baffle to the control box on the performance of the control box can be reduced, allowing the impurities to be discharged directionally through the drainage port, and ensuring the normal operation of the energy storage device.

In some implementations, the baffle is arranged obliquely, the baffle includes a first end and a third end that are close to the bottom of the energy storage device, the extension portion is arranged on both an edge of the first end and an edge of the third end, and the extension portion arranged on the edge of the first end and the extension portion arranged on the edge of the third end are apart from each other to form the drainage port.

In this embodiment, the extension portion is arranged on both of the edge of the first end and the edge of the third end of the baffle close to the bottom of the energy storage device, and the extension portion arranged on the edge of the first end and the extension portion arranged on the edge of the third end are apart from each other to form the drainage port, so that impurities such as liquids, pollutants, or dust from above the control box can be directionally discharged through the drainage port, reducing the impact on the performance of the control box and ensuring the normal operation of the energy storage device. Meanwhile, the drainage port has a simple structural design and is easy to manufacture, which can lower the processing cost of the energy storage device.

In some implementations, the main body portion and the extension portion are integrally formed. In this way, the main body portion and the extension portion of the baffle are integrally formed, so that the connection strength between the main body portion and the extension portion of the baffle can be enhanced, thereby improving the structural stability and reliability of the baffle.

In some implementations, the baffle is connected to a compartment wall of the first compartment through a bolt and/or a strap.

In this embodiment, when the baffle and the compartment wall of the first compartment are connected through a bolt and/or a strap, the structural stability of the connection between the baffle and the compartment wall of the first compartment can be enhanced. Meanwhile, this connection method is simple and reliable and convenient for disassembly, and can improve the assembly efficiency of the energy storage device. In addition, when the baffle and the compartment wall of the first compartment are connected through a strap, because the strap can provide flexible fixation to some extent, the impact of the processing tolerance of the baffle on the connection between the baffle and the compartment wall of the first compartment can be reduced.

In some implementations, a first limiting member is provided on the compartment wall of the first compartment, and the first limiting member is located below the baffle for supporting the baffle. In this way, in this embodiment, the first limiting member is arranged below the baffle, and the first limiting member is used for supporting the baffle, which can further enhance the relative position stability of the baffle within the first compartment and facilitates the installation and fixation between the baffle and the compartment wall.

In some implementations, a first limiting member is provided on the first wall and/or the second wall, and the first limiting member is located below the baffle for supporting the baffle. In this way, compared to the solution of providing the first limiting member on each of four walls of the first compartment, the first limiting member is arranged on the first wall and/or the second wall of the first compartment, which can ensure the structural stability of the connection between the baffle and the first compartment while reducing the processing cost of the energy storage device.

In some implementations, a second limiting member is further provided on a compartment wall of the first compartment, and the second limiting member is located above the baffle. In this way, in this embodiment, the second limiting member is arranged on the compartment wall of the first compartment, and the second limiting member is located above the baffle, for example, the second limiting member may be located above an edge of one end of the baffle to limit the displacement of the baffle in a height direction of the energy storage device, which can further enhance the relative position stability of the baffle within the first compartment.

In some implementations, the first limiting member includes a first portion and a second portion that are connected to each other, where the first portion is connected to the first wall or the second wall, and the first wall and the second wall are two walls of the first compartment that face each other in the horizontal direction; and the second limiting member includes a third portion and a fourth portion that are connected to each other, where the third portion is connected to the first wall or the second wall, and the second portion and the fourth portion both extend toward the inside of the first compartment.

In this embodiment, the first limiting member includes the first portion connected to the first wall or the second wall and the second portion extending toward the inside of the first compartment. The second limiting member includes the third portion connected to the first wall or the second wall and the fourth portion extending toward the inside of the first compartment, in other words, the baffle is supported by the second portion and the fourth portion, which enhances the relative position stability of the baffle within the first compartment. Furthermore, the first limiting member and the second limiting member have simple structures and are easy to process, which can improve the assembly rate of the energy storage device.

In some implementations, the first limiting member and/or the second limiting member is connected or fixed to a compartment wall of the first compartment through welding, riveting, bolting, or bonding. In this way, in this embodiment, the structural stability of the connection between the first limiting member and/or the second limiting member and the compartment wall of the first compartment can be enhanced. This connection method is simple and reliable, and is conducive to reducing the processing cost of the energy storage device.

In some implementations, a water cooling unit or a battery is arranged above the baffle. In this way, with the baffle arranged above the control box in this embodiment of this application, the adverse impact of impurities such as liquids, pollutants, or dust falling from the water cooling unit or battery above the control box can be reduced, and the normal operation of the energy storage device can be ensured.

In some implementations, the water cooling unit is arranged above the baffle, the energy storage device includes a box, and a ventilation apparatus is arranged at a position of the box facing the water cooling unit.

In this embodiment, when the water cooling unit is arranged above the baffle and the ventilation apparatus is arranged at the position of the box of the energy storage device that faces the water cooling unit, based on the baffle arranged above the control box provided in this embodiment of this application, not only the impact of impurities such as liquids, pollutants, or dust entering the interior of the energy storage device through the ventilation apparatus on the control box can be reduced, but also the impact of emissions from the water cooling unit on the control box can be reduced, ensuring the normal operation of the energy storage device.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
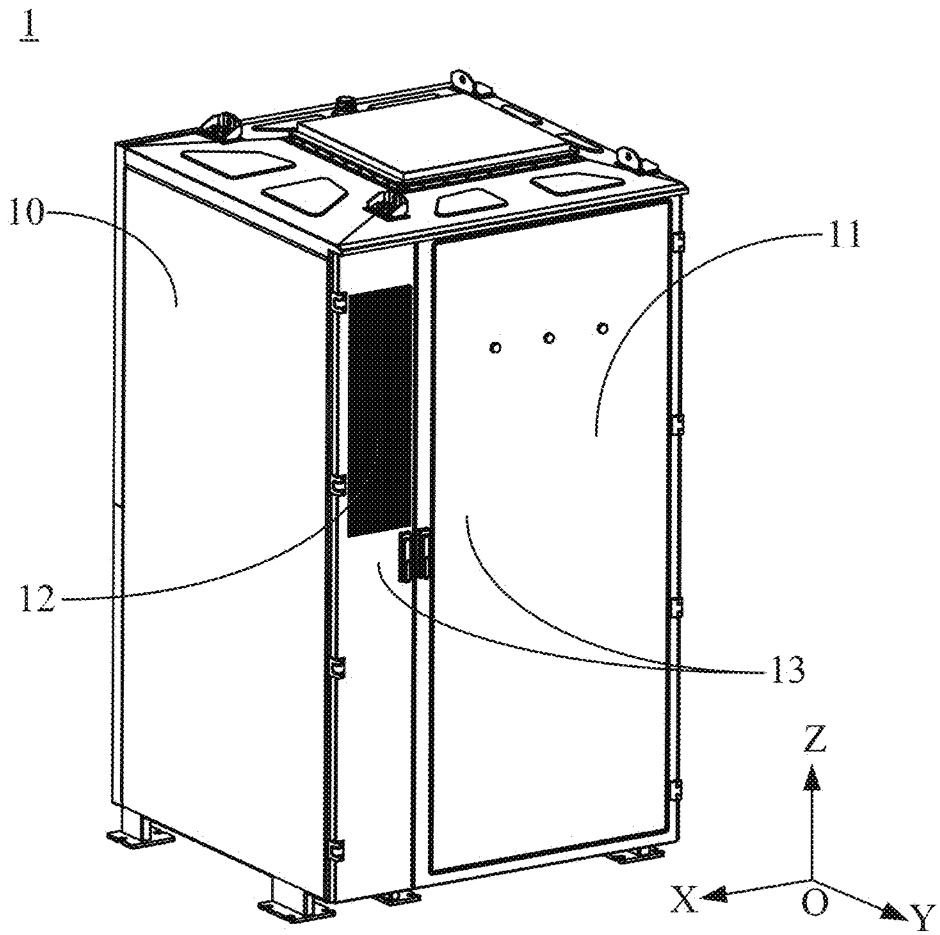
FIG. 1 is a schematic structural diagram of an energy storage device according to an embodiment of this application.

Description of reference signs: 1: energy storage device; 10: box; 11: outer wall; 12: ventilation apparatus; 13: cabinet door; 110: first compartment; 111: control box; 112: control panel; 113: compartment wall; 120: second compartment; 121: water cooling unit; 130: third compartment; 1101: first wall; 1102: second wall; 1103: bottom wall; 1104: through hole; 14: baffle; 141: first end; 142: second end; 143: third end; 144: fourth end; 145: drainage port; 1411: main body portion; 1412: extension portion; 1413: bolt hole; 1414: strap hole; 1415: bolt; 1416: strap; 15: first limiting member; 151: first portion; 152: second portion; 16: second limiting member; 161: third portion; 162: fourth portion; A1: first direction; A2: second direction; and H: height of extension portion.

In the accompanying drawings, the figures are not necessarily drawn to scale.

DESCRIPTION OF EMBODIMENTS

The following further describes implementations of this application in detail with reference to the accompanying drawings and embodiments. The detailed description of the embodiments and the accompanying drawings are intended to illustrate the principle of this application, rather than to limit the scope of this application, meaning this application is not limited to the embodiments described herein.

In the description of this application, it should be noted that the terms “upper”, “lower”, “left”, “right”, “inside”, “outside”, etc. indicating directions or positional relationships are only for the convenience of describing this application and simplifying the description. They do not indicate or imply that the referenced devices or elements must be constructed or operate in specific orientations, and should not be construed as limitations of this application. In addition, the terms “first”, “second”, “third”, and the like are merely intended for a purpose of description, and shall not be understood as any indication or implication of relative importance. “Perpendicular” is not perpendicular in the strict sense but within an allowable range of error. “Parallel” is not parallel in the strict sense but within an allowable range of error.

The orientation terms appearing in the following description all are directions shown in the figures, and do not limit the specific structure of the application. In the description of this application, it should also be noted that unless otherwise specified and defined explicitly, the terms “mount”, “connect”, and “join” should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

The term "and/or" in this application is only an associative relationship for describing associated objects, indicating that three relationships may be present. For example, A and/or B may indicate three cases: presence of only A; presence of both A and B; and presence of only B. In addition, the character "/" in this application generally indicates an "or" relationship between contextually associated objects.

In the embodiments of this application, the same reference signs denote the same components. For brevity, in different embodiments, detailed descriptions of the same components are not repeated. It should be understood that, as shown in the accompanying drawings, sizes such as thickness, length, and width of various members and sizes such as thickness, length, and width of integrated devices in the embodiments of this application are merely for illustrative purposes and should not constitute any limitations on this application.

In this application, "multiple" means more than two (inclusive). Similarly, "multiple groups" means more than two (inclusive) groups, and "multiple pieces" means more than two (inclusive) pieces.

In some embodiments, for a control box installed inside an energy storage device, under the condition that impurities such as liquids, pollutants, or dust from above the control box fall onto a surface of the control box, they affect the performance stability of the control box, and in turn affect the normal operation of the energy storage device. Therefore, how to enhance the performance stability of the control box has become a technical issue that urgently needs to be solved in this field.

In view of this, an embodiment of this application provides an energy storage device, including: a control box arranged in a first compartment of the energy storage device; and a baffle arranged in the first compartment, located above the control box, and covering the control box. In this way, in this embodiment of this application, the baffle is arranged above the control box in the energy storage device, and the baffle can cover the control box, in other words, an orthographic projection of the control box on a horizontal plane falls within an orthographic projection of the baffle on the horizontal plane, so that the baffle can block impurities such as liquids, pollutants, or dust from above the control box from falling a surface of the control box, thus protecting the control box, enhancing the performance stability of the control box, and ensuring the normal operation of the energy storage device.

The energy storage device is a device that stores energy and typically can accommodate one or more energy storage elements, where the energy storage element may be, for example, a battery. One battery may also be referred to as a battery box, which includes an outer box and one or more battery cells encapsulated by the box. For example, the battery cell may include a metal battery, a lithium-ion secondary battery, a lithium-ion primary battery, a lithium-sulfur battery, a sodium/lithium-ion battery, a sodium-ion battery, a magnesium-ion battery, or the like. This is not limited in the embodiments of this application. The battery cell may be cylindrical, flat, cuboid, or of other shapes. This is not limited in the embodiments of this application. In some embodiments, the battery cell may include a housing. The housing is configured to encapsulate an electrode assembly, an electrolyte, and other components. The electrode assembly includes a positive electrode plate, a negative electrode plate, and a separator. During charging and discharging of the battery cell, active ions (such as lithium ions) intercalate and deintercalate back and forth between the positive electrode plate and the negative electrode plate. The separator is arranged between the positive electrode plate and the negative electrode plate to prevent short circuit of the positive electrode plate and the negative electrode plate and to allow the active ions to pass through.

It should be understood that the energy storage device in this embodiment of this application may be used to store batteries and may be applied in scenarios such as home energy storage, outdoor energy storage, and power grids.

To meet different power usage requirements, the battery may include multiple battery cells, and the multiple battery cells may be connected in series, parallel, or series-parallel, where being connected in series-parallel means a combination of series and parallel connections. The battery may also be referred to as a battery pack. Optionally, the multiple battery cells may be connected in series, parallel, or series-parallel to form a battery module first, and then multiple battery modules are connected in series, parallel, or series-parallel to form a battery. In other words, the multiple battery cells may be directly combined into a battery, or may first be combined into battery modules that are then combined into a battery.

Functional components may also be arranged in the energy storage device to manage or assist in the operation of the multiple energy storage elements. For example, the energy storage device may be provided with a thermal management component. The thermal management component includes but is not limited to an air conditioning component, a fan component, a water cooling pipeline, and may be configured to manage the heat inside the energy storage device to adjust the internal temperature of the energy storage device. For another example, the energy storage device may be provided with a control box to monitor and control various states of the energy storage device.

Figure 2:
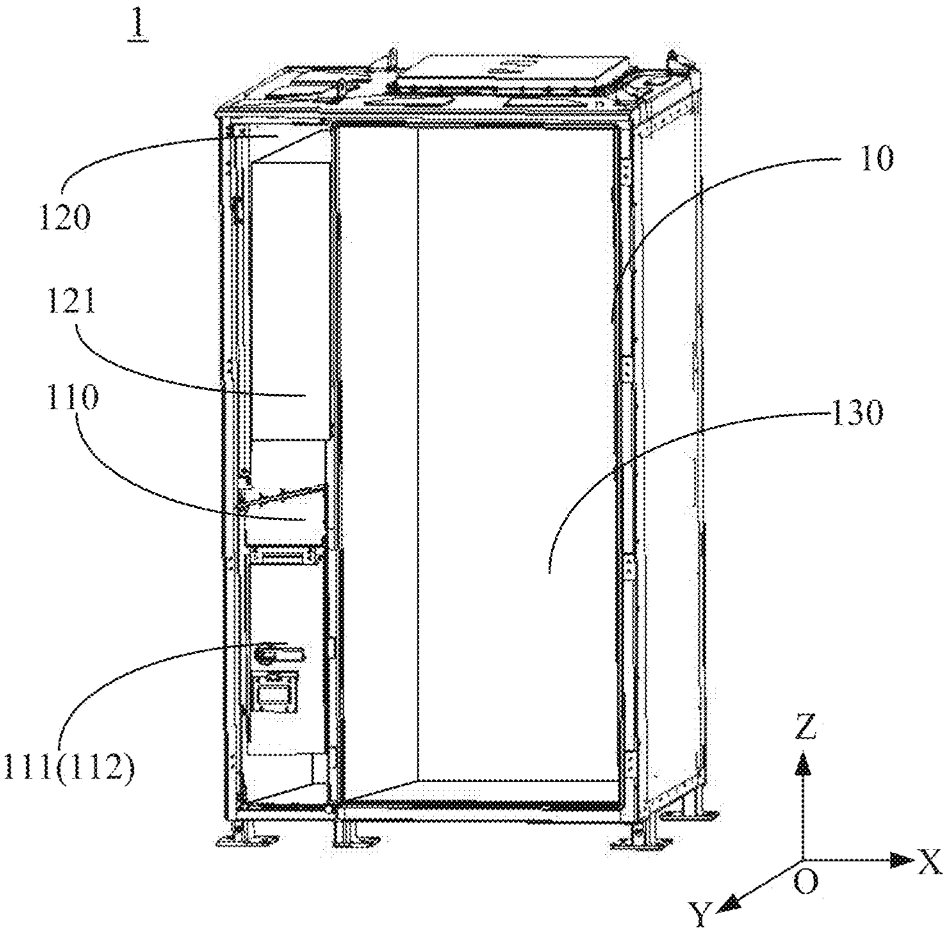
FIG. 2 is a schematic structural diagram of an energy storage device according to another embodiment of this application.

The technical solution provided in the embodiments of this application may be applied to energy storage devices of various types and sizes, and is described below using FIG. 1 and FIG. 2 as examples. FIG. 1 is a schematic structural diagram of an energy storage device according to an embodiment of this application. FIG. 2 is a schematic structural diagram of an energy storage device according to another embodiment of this application.

In this embodiment of this application, for ease of description, three mutually perpendicular directions are defined based on the placement position of the energy storage device 1, as shown in FIG. 1 and FIG. 2. The three directions include a length direction X, a width direction Y, and a height direction Z of the energy storage device 1. Specifically, the width direction Y of the energy storage device 1 may be perpendicular to a direction of a door of the energy storage device 1; and the height direction Z of the energy storage device 1 may be parallel to the direction of gravity.

It should be understood that the energy storage device 1 of this embodiment of this application may be a hollow polyhedral structure. For example, the energy storage device 1 may be a cylindrical structure. The energy storage device 1 may include multiple outer walls 11. As shown in FIG. 1, the outer wall 11 of the energy storage device 1 illustrated in this embodiment of this application may be any wall of the energy storage device 1. Correspondingly, the outer wall 11 of the energy storage device 1 may have any shape. For example, this embodiment of this application mainly takes the rectangular outer wall 11 as an example, but this embodiment of this application is not limited thereto.

It should also be understood that a cabinet door 13 may be arranged on the outer wall 11 of the energy storage device 1. A quantity of cabinet doors 13 may be set according to actual needs. As shown in FIG. 1, two cabinet doors 13 are arranged on the outer wall 11 of the energy storage device 1.

As shown in FIG. 1 and FIG. 2, the energy storage device 1 provided in this embodiment of this application includes a box 10. The box 10 may be a cuboid structure so as to facilitate the transportation and assembly of the energy storage device 1. In an example, this embodiment of this application is not limited thereto.

In some embodiments, the box 10 may be partitioned into multiple functional compartments according to actual needs. For example, as shown in FIG. 2, the energy storage device 1 illustrated in FIG. 2 may be partitioned into a first compartment 110, a second compartment 120, and a third compartment 130. The first compartment 110 may be referred to as a control compartment. The control compartment is configured to accommodate the control box to manage or assist in the operation of a component in the energy storage device 1. The second compartment 120 may be referred to as a thermal management compartment. The thermal management compartment is configured to accommodate a thermal management component to adjust the internal temperature of the energy storage device 1. The third compartment may be referred to as an energy storage compartment. The energy storage compartment is configured to accommodate an energy storage element to provide electrical energy.

Figure 3:
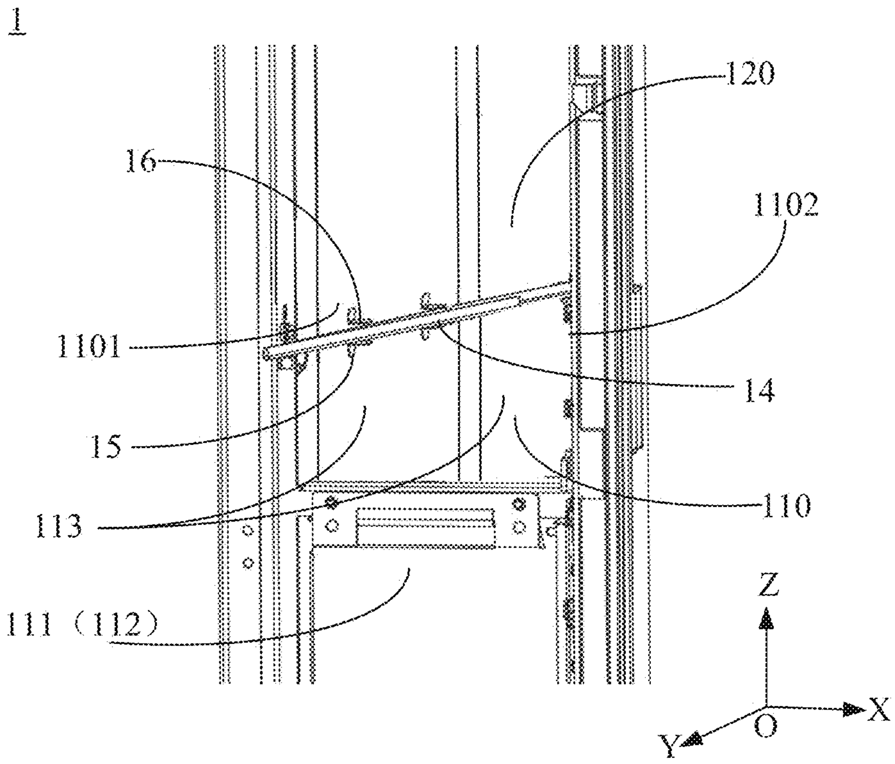
FIG. 3 is a partial schematic structural diagram of an energy storage device according to an embodiment of this application.
Figure 4:
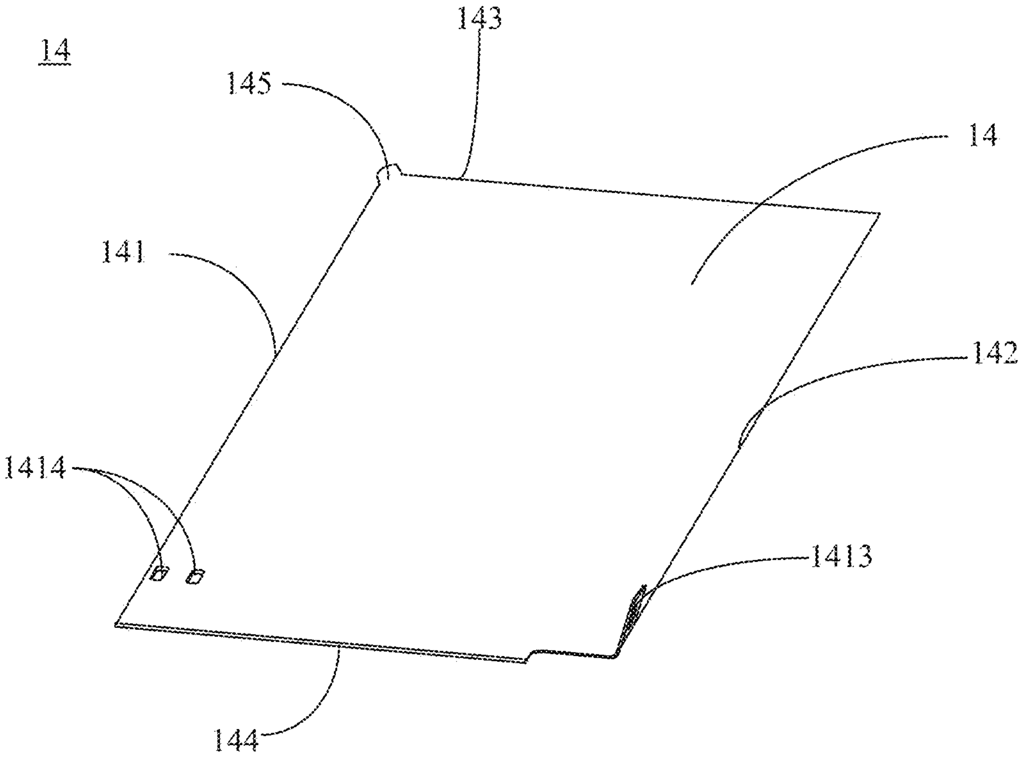
FIG. 4 is a schematic structural diagram of a baffle according to an embodiment of this application.
Figure 5:
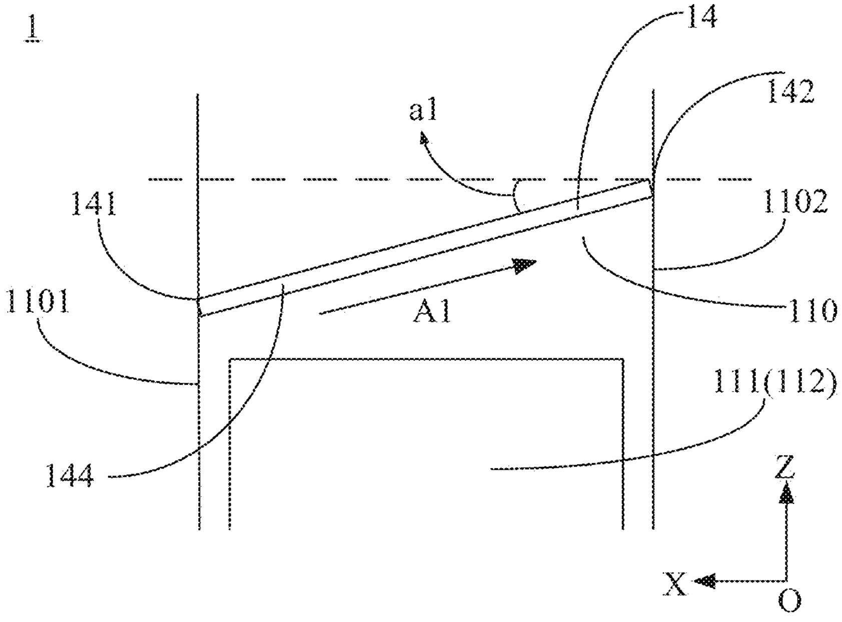
FIG. 5 is a partial cross-sectional schematic view of an energy storage device according to an embodiment of this application.
Figure 6:
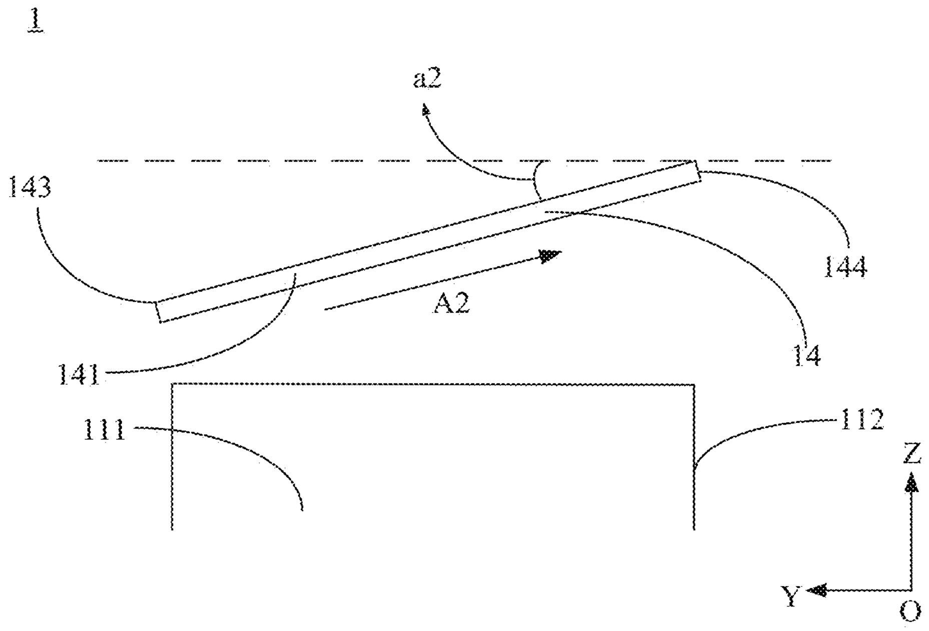
FIG. 6 is a partial cross-sectional schematic view of an energy storage device according to another embodiment of this application.
Figure 7:
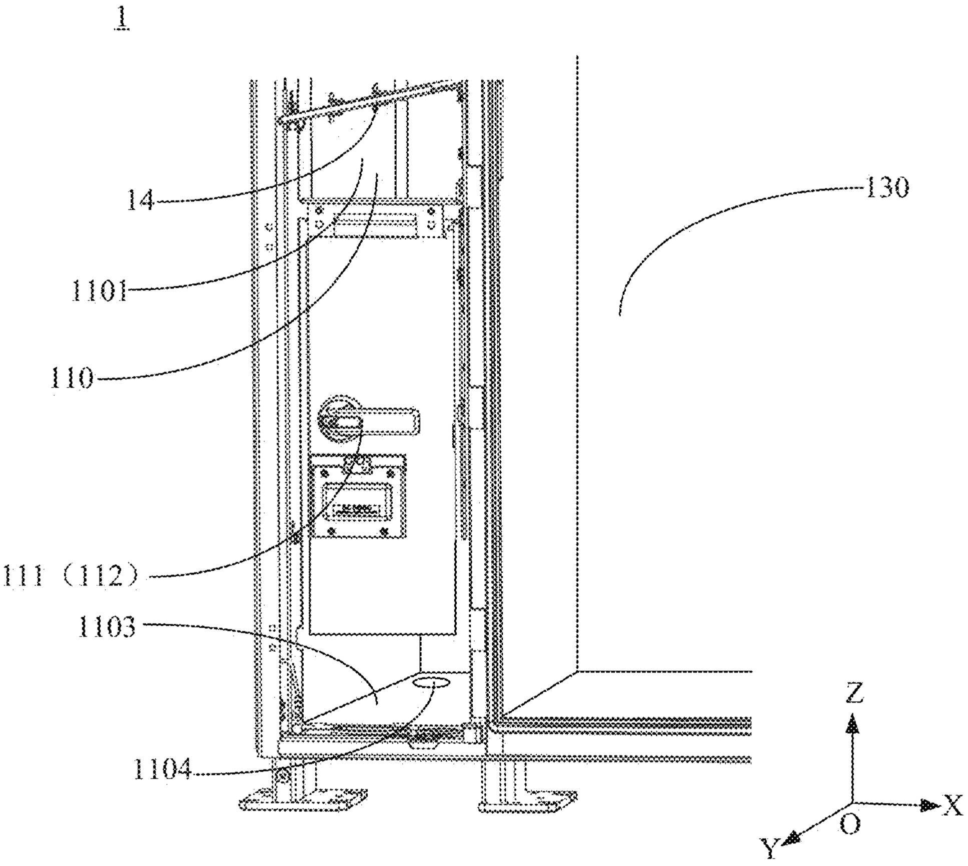
FIG. 7 is a partial schematic structural diagram of an energy storage device according to an embodiment of this application.
Figure 8:
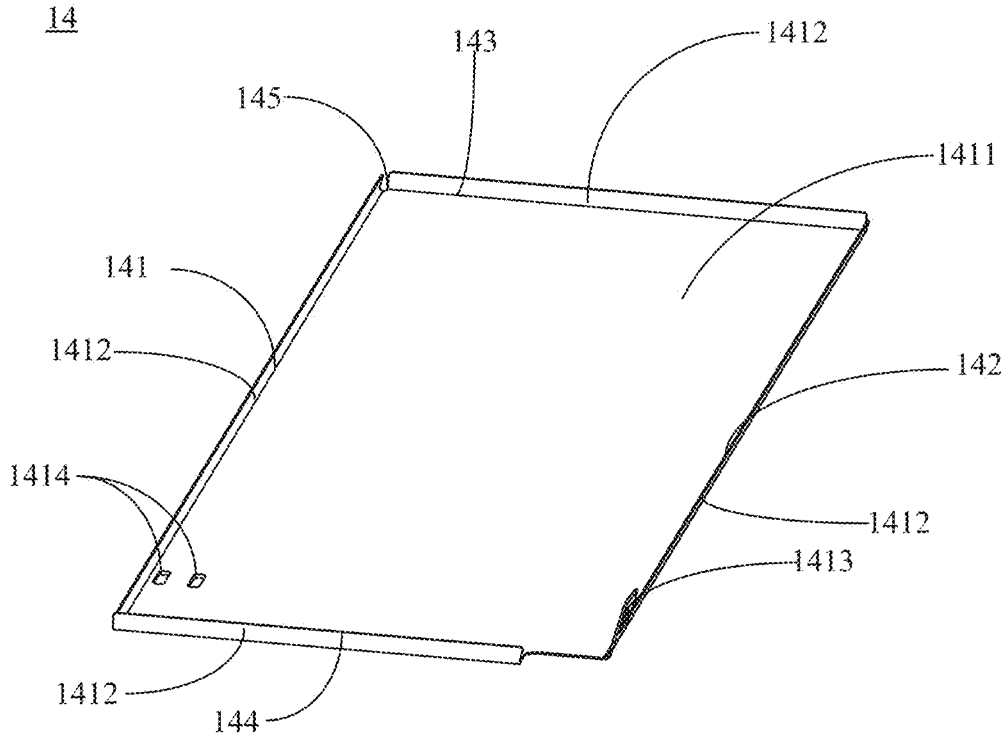
FIG. 8 is a schematic structural diagram of a baffle according to another embodiment of this application.
Figure 9:
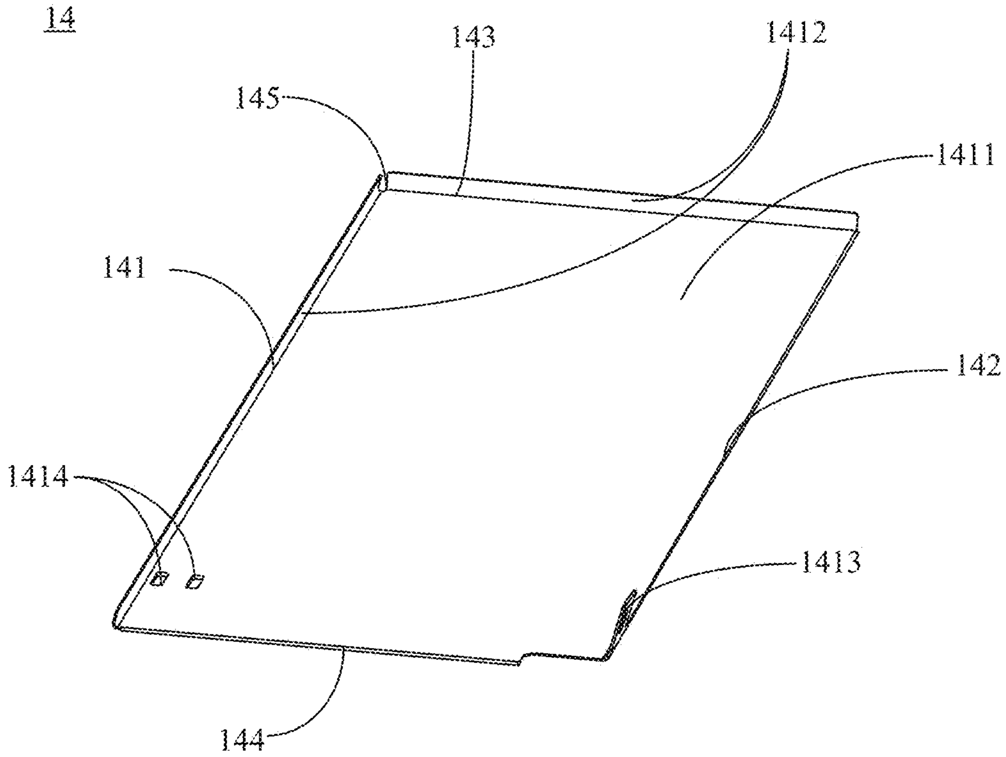
FIG. 9 is a schematic structural diagram of a baffle according to another embodiment of this application.
Figure 10:
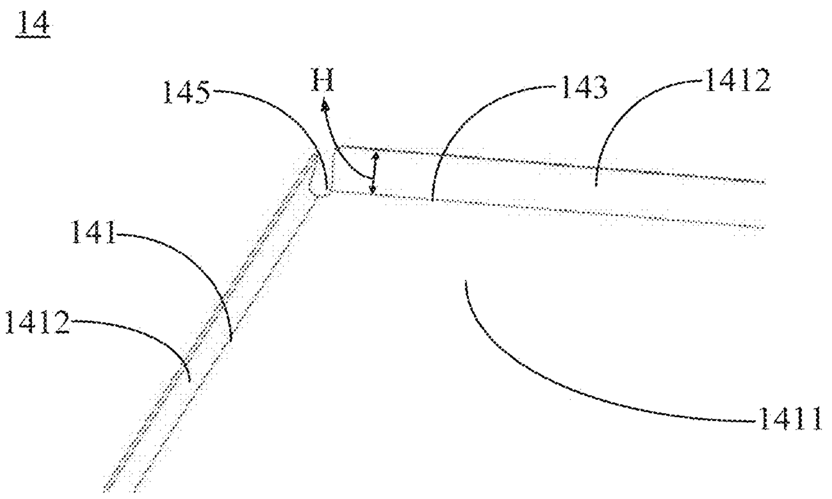
FIG. 10 is a partially enlarged schematic structural diagram of a baffle according to an embodiment of this application.
Figure 11:
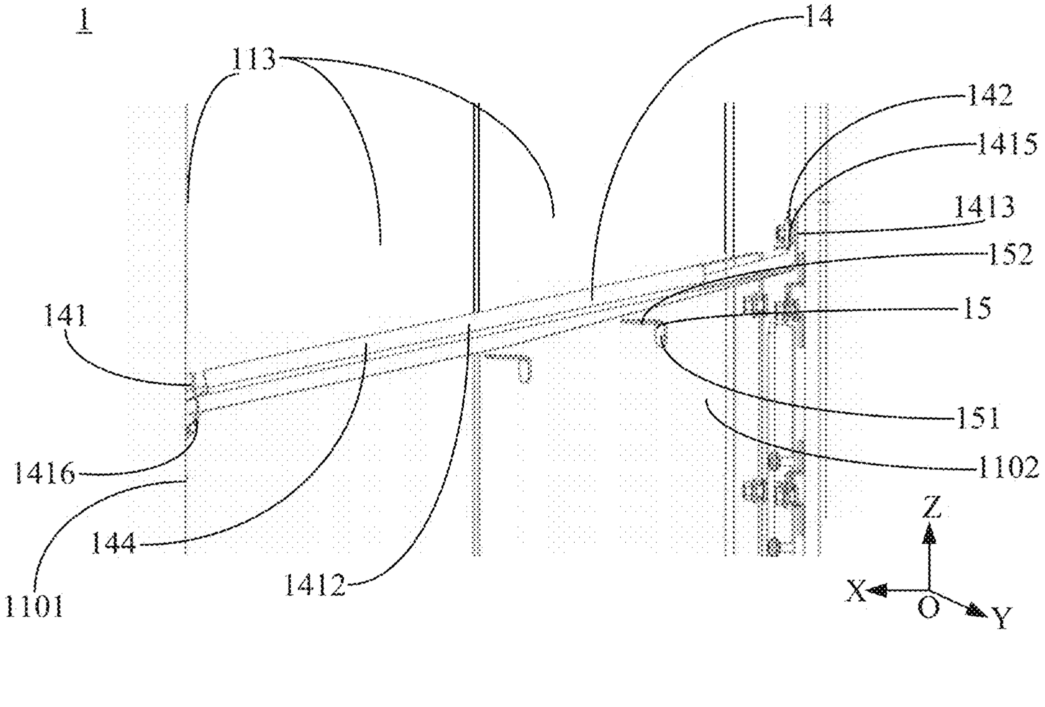
FIG. 11 is a partial schematic structural diagram of an energy storage device according to another embodiment of this application.
Figure 12:
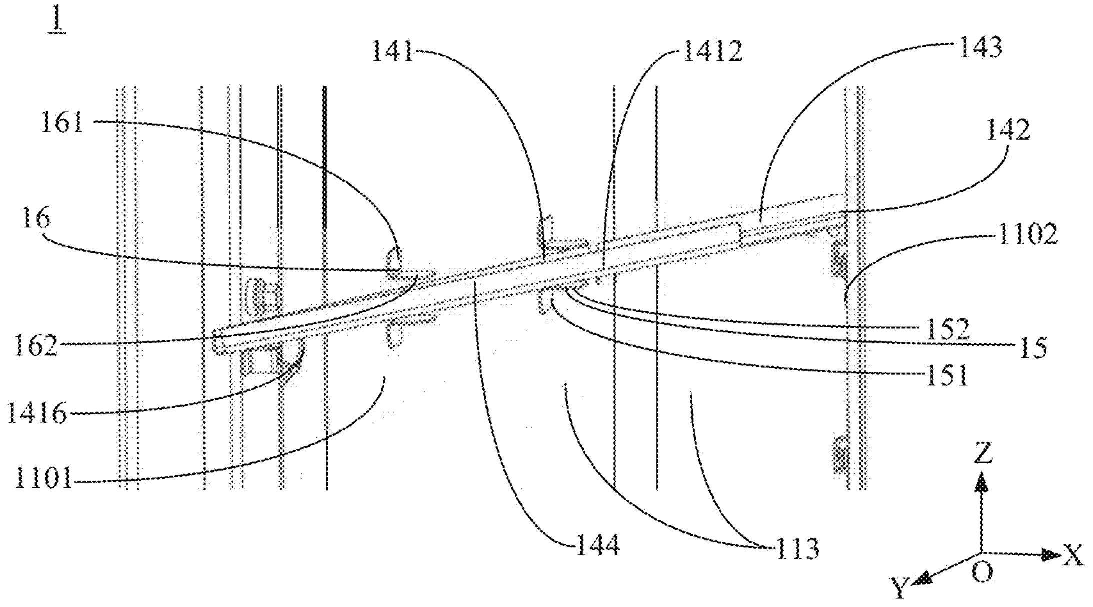
FIG. 12 is a partial schematic structural diagram of an energy storage device according to another embodiment of this application.

FIG. 3 is a partial schematic structural diagram of an energy storage device 1 according to an embodiment of this application. For example, FIG. 3 may be a partial structural schematic view of the energy storage device 1 in FIG. 2. FIG. 4 is a schematic structural diagram of a baffle according to an embodiment of this application. FIG. 5 is a partial cross-sectional schematic view of an energy storage device 1 according to this embodiment of this application. FIG. 6 is a partial cross-sectional schematic view of an energy storage device 1 according to another embodiment of this application. FIG. 7 is a partial schematic structural diagram of another energy storage device 1 according to an embodiment of this application. FIG. 8 is a schematic structural view of another baffle according to this embodiment of this application. FIG. 9 is a schematic structural view of another baffle according to this embodiment of this application. FIG. 10 is a partially enlarged structural schematic view of a baffle according to an embodiment of this application. FIG. 11 is a partial schematic structural diagram of another energy storage device 1 according to an embodiment of this application. FIG. 12 is a partial schematic structural diagram of another energy storage device 1 according to an embodiment of this application.

In some embodiments, as shown in FIG. 2 and FIG. 3, the energy storage device 1 includes: a control box 111 arranged in a first compartment 110 of the energy storage device 1; and a baffle 14 arranged in the first compartment 110, located above the control box 111, and covering the control box 111.

It should be understood that a shape of the baffle 14 in this embodiment of this application may be set according to actual needs. For example, the baffle 14 may be set as a square thin plate. In an example, this embodiment of this application is not limited thereto.

It should also be understood that the material of the baffle 14 in this embodiment of this application may alternatively be set according to actual needs. For example, the baffle 14 may be made of metal, polycarbonate, polycarbonate alloy materials, nylon, polyethylene terephthalate, polypropylene, or the like. In an example, this embodiment of this application is not limited thereto.

It should also be understood that in this embodiment of this application, the baffle 14 covering the control box 111 may mean that an area of an orthographic projection of the baffle 14 on a horizontal plane is greater than or equal to an area of an orthographic projection of the control box 111 on the horizontal plane. In some other embodiments, the baffle 14 covering the control box 111 may mean that an orthographic projection of the baffle 14 on a horizontal plane covers an orthographic projection of the control panel 112 of the control box 111 on the horizontal plane.

In this embodiment of this application, the control box 111 may be a box-type structure with a control component, where the control component may be a programmable logic controller. The control box 111 may be electrically connected to one or more batteries, and the control box 111 may also be connected to a master control system. For example, the control box 111 may read data such as voltage, current, and temperature of the batteries during operation to control the on/off state of the batteries.

In this way, in this embodiment, the baffle 14 is arranged above the control box 111 in the energy storage device 1, and the baffle 14 can cover the control box 111, in other words, an orthographic projection of the control box 111 on a horizontal plane falls within an orthographic projection of the baffle 14 on the horizontal plane, so that the baffle 14 can block impurities such as liquids, pollutants, or dust from above the control box 111 from falling a surface of the control box 111, thus protecting the control box 111, enhancing the performance stability of the control box 111, and ensuring the normal operation of the energy storage device 1.

It should be understood that the energy storage device 1 in this embodiment of this application may further be provided with a ventilation apparatus 12, where the ventilation apparatus 12 is configured to exchange heat between the interior and exterior of the energy storage device 1 so as to achieve heat dissipation of the energy storage device 1. It should be understood that in this embodiment of this application, the ventilation apparatus 12 on the energy storage device 1 may be located on any wall of the energy storage device 1 to dissipate heat from the energy storage device 1, so as to reduce the internal temperature of the energy storage device 1. For example, as shown in FIG. 1, the ventilation apparatus 12 may be installed on an outer wall 11 of the cabinet door 13.

In some embodiments, as shown in FIG. 1, a quantity of ventilation apparatuses 12 on the energy storage device 1 may be set according to actual needs. When the energy storage device 1 is provided with multiple ventilation apparatuses 12, heat dissipation can be performed for multiple regions of the energy storage device 1, or multiple ventilation apparatuses 12 may be set for a certain region of the energy storage device 1, so as to improve the heat dissipation effect for that region. For example, the ventilation apparatus 12 in this embodiment of this application may be installed on two walls of the second compartment 120 of the energy storage device 1 along the width direction Y of the energy storage device 1, in other words, the energy storage device 1 may be provided with two ventilation apparatuses 12 facing each other, so as to improve the heat dissipation effect on the components in the second compartment 120. In an example, this embodiment of this application is not limited thereto. It should also be understood that the ventilation apparatus 12 may be implemented in various ways. For example, the ventilation apparatus 12 may be a through-hole structure arranged on a side wall of the second compartment 120. For another example, the ventilation apparatus 12 may further include a louver structure. In an example, this embodiment of this application is not limited thereto.

It should also be understood that the connection method between the ventilation apparatus 12 and the energy storage device 1 in this embodiment of this application may be flexibly set according to actual application. For example, the ventilation apparatus 12 and the energy storage device 1 may be fixed on the outer wall 11 of the energy storage device 1 through bolting, welding, or bonding.

In some embodiments, as shown in FIG. 4 and FIG. 5, the baffle 14 includes a first end 141 and a second end 142, and the baffle 14 gradually moves away from a bottom of the energy storage device 1 from the first end 141 to the second end 142. In this way, in this embodiment of this application, along the first end 141 to the second end 142 of the baffle 14, the baffle 14 gradually moves away from the bottom of the energy storage device 1, in other words, the baffle 14 is arranged obliquely, so that impurities such as liquids, pollutants, or dust from above the control box 111 can be discharged along an inclined direction of the baffle 14. For example, these impurities such as liquids, pollutants, or dust can be discharged through the baffle 14 to the bottom of the energy storage device 1, so that these impurities can be concentratedly treated at the bottom of the energy storage device 1 and discharged to the outside of the energy storage device 1 in time. This can reduce the adverse impact on the control box 111 caused by a lot of impurities accumulated on the baffle 14, and ensure the normal operation of the energy storage device 1.

In some embodiments, as shown in FIG. 4 and FIG. 5, the first compartment 110 includes a first wall 1101 and a second wall 1102 that face each other in a horizontal direction, where the first end 141 and the second end 142 are respectively connected to the first wall 1101 and the second wall 1102. In this way, the first end 141 and the second end 142 of the baffle 14 are connected to the first wall 1101 and the second wall 1102 of the first compartment 110 respectively, so that the baffle 14 can be fixed above the control box 111, thereby enhancing the structural stability of the baffle 14.

In some embodiments, as shown in FIG. 5 and FIG. 6, the first end 141 and the second end 142 are distributed along a first direction A1; and the baffle 14 further includes a third end 143 and a fourth end 144 that are distributed along a second direction A2, and the baffle 14 gradually moves away from the bottom of the energy storage device 1 from the third end 143 to the fourth end 144, where the second direction A2 is perpendicular to the first direction A1.

It should be understood that in some embodiments, the first direction A1 in this embodiment this application may be another direction that has a certain included angle with the length direction X or the width direction Y of the energy storage device 1. In an example, this embodiment of this application is not limited thereto.

In this embodiment, the baffle 14 is arranged obliquely in the first direction A1 and also arranged obliquely in the second direction A2, and the first direction A1 is perpendicular to the second direction A2, so that a lowest point of the baffle 14 is located at a joint of the first end 141 and the third end 143 of the baffle 14, so as to facilitate the movement of impurities such as liquids, pollutants, or dust from above the control box 111 toward the joint of the first end 141 and the third end 143, thereby achieving directional collection or discharge of impurities, improving the efficiency of treating these impurities, and ensuring the normal operation of the energy storage device 1.

In some embodiments, as shown in FIG. 5, when the first end 141 and the second end 142 are distributed along the first direction A1, a value of an included angle α1 between the baffle 14 and the horizontal plane may be set according to actual needs. For example, a value range of the included angle α1 between the baffle 14 and the horizontal plane may be [5°, 60°]. Specifically, the value range of the included angle α1 between the baffle 14 and the horizontal plane may be 5°, 10°, 15°, 20°, 25°, 30°, 35°, 40°, 45°, 50°, 55°, 60°, or the value of the included angle α1 is within a range defined by any two of these values. In some embodiments, the value range of the angle α1 between the baffle 14 and the horizontal plane may be [10°, 30°].

In some other embodiments, as shown in FIG. 6, when the third end 143 and the fourth end 144 are distributed along the second direction A2, a value of an included angle α2 between the baffle 14 and the horizontal plane may be set according to actual needs. For example, a value range of the angle α2 between the baffle 14 and the horizontal plane may be [5°, 60°]. Specifically, the value range of the angle α2 between the baffle 14 and the horizontal plane may be 5°, 10°, 15°, 20°, 25°, 30°, 35°, 40°, 45°, 50°, 55°, 60°, or the value of the included angle α2 is within a range defined by any two of these values. In some embodiments, the value range of the angle α2 between the baffle 14 and the horizontal plane may be [10°, 30°].

In some embodiments, as shown in FIG. 4, the baffle 14 is provided with a drainage port 145, where the drainage port 145 is located at a joint of the first end 141 and the third end 143. In this way, in this embodiment of this application, compared to other positions of the baffle 14, the joint of the first end 141 and the third end 143 of the baffle 14 is a region of the baffle 14 closest to a bottom wall 1103 of the energy storage device 1. The drainage port 145 is arranged at the joint of the first end 141 and the third end 143 of the baffle 14, so that impurities such as liquids, pollutants, or dust from above the control box 111 can be rapidly discharged, ensuring the normal operation of the energy storage device 1.

It should be understood that the structure of the drainage port 145 arranged on the baffle 14 in this embodiment of this application may be a groove, a through cylinder, a through cone, or the like, so as to discharge impurities such as liquids, pollutants, or dust from above the control box 111 through the drainage port 145. In an example, this embodiment of this application is not limited thereto.

In some embodiments, an orthographic projection of the drainage port 145 on a horizontal plane falls outside an orthographic projection of the control box 111 on the horizontal plane. In this way, in this embodiment, under the condition that the orthographic projection of the drainage port 145 on the baffle 14 on a horizontal plane falls outside the orthographic projection of the control box 111 on the horizontal plane, impurities flowing through the baffle 14 can be discharged through the drainage port 145 so as to reduce the impact on the performance of the control box 111. For example, impurities such as liquids, pollutants, or dust from above the control box 111 can be discharged to a partial region of the bottom wall 1103 of the energy storage device 1 through the drainage port and then discharged to the outside of the energy storage device 1 in time. In addition, during the falling process of the impurities, the performance of the control box 111 is not affected, which helps to ensure the normal operation of the energy storage device 1.

In some embodiments, as shown in FIG. 7, a through hole 1104 communicating with the drainage port 145 is provided on the bottom wall 1103 of the first compartment 110.

It should be understood that in this embodiment of this application, a shape of the through hole 1104 communicating with the drainage port 145 provided on the bottom wall 1103 of the first compartment 110 may be set according to actual needs. For example, the shape of the through hole 1104 may be oval. In an example, this embodiment of this application is not limited thereto. It should also be understood that in some embodiments, a drainage valve, a floor drain, or the like may be arranged inside the through hole 1104 to discharge impurities such as liquids, pollutants, or dust from above the control box 111 to the outside of the energy storage device 1 in time.

It should also be understood that in some embodiments, the through hole 1104 on the bottom wall 1103 of the first compartment 110 in this embodiment of this application communicates with the drainage port 145, which may also mean that impurities such as liquids, pollutants, or dust from above the control box 111 enter the through hole 1104 under the action of gravity and are discharged to the outside of the energy storage device 1 through the through hole 1104. In some other embodiments, the through hole 1104 on the bottom wall 1103 of the first compartment 110 in this embodiment of this application communicates with the drainage port 145, which may mean that the drainage port 145 communicates with the through hole 1104 through a communication pipeline. To be specific, impurities such as liquids, pollutants, or dust from above the control box 111 can be discharged to the outside of the energy storage device 1 through the drainage port 145 on the baffle 14, the communication pipeline, and the through hole 1104 on the bottom wall 1103 of the energy storage device 1 in sequence. In an example, this embodiment of this application is not limited thereto.

In this way, in this embodiment of this application, impurities such as liquids, pollutants, or dust from above the control box 111 can be discharged to the outside of the energy storage device 1 through the drainage port 145 on the baffle 14 and the through hole 1104 on the bottom wall 1103 of the energy storage device 1 in sequence, so as to reduce the adverse impact of impurities on the control box 111, enhancing the performance stability of the control box 111, and ensuring the normal operation of the energy storage device 1.

In some other embodiments, a through-hole structure communicating with the drainage port 145 may also be provided on a side wall of the first compartment 110 of the energy storage device 1 in this embodiment of this application. For example, the through-hole structure may penetrate through the side wall of the first compartment 110, so that the through-hole structure can discharge impurities such as liquids, pollutants, or dust from above the control box 111 to the outside of the energy storage device 1 through the drainage port 145 on the baffle 14 and the through-hole structure on the side wall of the first compartment 110 in sequence. It should also be understood that in this embodiment of this application, a shape of the through-hole structure may be set according to actual needs. For example, the shape of the through-hole structure may be circular. In an example, this embodiment of this application is not limited thereto.

In some implementations, as shown in FIG. 6, the control box 111 is a main control box, a control panel 112 is provided on a side of the main control box, the baffle 14 is arranged obliquely, and an end of the baffle 14 far away from the control panel 112 is inclined toward the bottom of the energy storage device 1.

It should be understood that in this embodiment of this application, the control box 111 may be the main control box. The main control box is electrically connected to multiple batteries. The main control box may be configured to control the connection or disconnection of a circuit connecting multiple batteries to an external component (such as electric device) and to control the connection or disconnection of an internal circuit of each battery in one row so as to improve battery usage safety. The main control box may be a box-type structure with a control component, and the control component may be a PLC (Programmable Logic Controller, programmable logic controller).

In this way, in this embodiment, the baffle 14 above the main control box is arranged to be inclined away from an end of a control panel 112 of the main control box and toward the bottom of the energy storage device 1, so that the adverse impact of impurities such as liquids, pollutants, or dust from above the main control box on the control panel 112 of the main control box can be reduced, the performance stability of the main control box can be enhanced, and the normal operation of the energy storage device 1 can be ensured.

In some embodiments, as shown in FIG. 8 and FIG. 11, the baffle 14 includes a main body portion 1411 and an extension portion 1412 that are connected to each other, where the extension portion 1412 extends in a direction away from the bottom of the energy storage device 1. In this way, in this embodiment of this application, the extension portion 1412 of the baffle 14 is arranged to extend in the plane of the baffle 14 in the direction away from the bottom of the energy storage device 1, so that the impact of impurities such as liquids, pollutants, or dust from above the control box 111 flowing from an edge of one end of the baffle 14 to the control box 111 on the performance of the control box 111 can be reduced, allowing the impurities to be discharged directionally through the drainage port 145, and ensuring the normal operation of the energy storage device 1.

In some embodiments, as shown in FIG. 10, a height H of the extension portion 1412 of the baffle 14 in this embodiment of this application, that is, a height H of the extension portion 1412 extending in a direction away from the bottom of the energy storage device 1, may be set according to actual needs. For example, the height H of the extension portion 1412 of the baffle 14 in this embodiment of this application may be [6 mm, 10 mm]. Specifically, the height H of the extension portion 1412 of the baffle 14 in this embodiment of this application may be 6 mm, 6.2 mm, 6.4 mm, 6.6 mm, 6.8 mm, 7 mm, 7.2 mm, 7.4 mm, 7.6 mm, 7.8 mm, 8 mm, 8.2 mm, 8.4 mm, 8.6 mm, 8.8 mm, 9 mm, 9.2 mm, 9.4 mm, 9.6 mm, 9.8 mm, 10 mm, or a value of H is within a range defined by any two of these values.

In some embodiments, as shown in FIG. 9, the baffle 14 is arranged obliquely, the baffle 14 includes a first end 141 and a third end 143 that are close to the bottom of the energy storage device 1, the extension portion 1412 is arranged on both an edge of the first end 141 and an edge of the third end 143, and the extension portion 1412 arranged on the edge of the first end 141 and the extension portion 1412 arranged on the edge of the third end 143 are apart from each other to form the drainage port 145. In this way, in this embodiment, the extension portion 1412 is arranged on both of the edge of the first end 141 and the edge of the third end 143 of the baffle 14 close to the bottom of the energy storage device 1, and the extension portion 1412 arranged on the edge of the first end 141 and the extension portion 1412 arranged on the edge of the third end 143 are apart from each other to form the drainage port 145, so that impurities such as liquids, pollutants, or dust from above the control box 111 can be directionally discharged through the drainage port 145, reducing the impact on the performance of the control box 111 and ensuring the normal operation of the energy storage device 1. Meanwhile, the drainage port 145 has a simple structural design and is easy to manufacture, which can lower the processing cost of the energy storage device 1.

In an embodiment, the main body portion 1411 and the extension portion 1412 are integrally formed. In this way, the main body portion 1411 and the extension portion 1412 of the baffle 14 are integrally formed, so that the connection strength between the main body portion 1411 and the extension portion 1412 of the baffle 14 can be enhanced, thereby improving the structural stability and reliability of the baffle 14.

It should be understood that the main body portion 1411 and the extension portion 1412 of the baffle 14 in this embodiment of this application may be split structures. For example, the main body portion 1411 and the extension portion 1412 of the baffle 14 may be fixed through welding or bonding. In an example, this embodiment of this application is not limited thereto.

In some embodiments, as shown in FIG. 11 and FIG. 12, the baffle 14 is connected to a compartment wall 113 of the first compartment 110 through a bolt 1415 and/or a strap 1416. For example, as shown in FIG. 4, 8, and FIG. 9, the baffle 14 may be provided with a bolt hole 1413 and a strap hole 1414 that are connected to the compartment wall 113 of the first compartment 110. Specifically, as shown in FIG. 11, the bolt hole 1413 of the baffle 14 may be used with the bolt 1415 to achieve the fixation between the second wall 1102 of the first compartment 110 and the baffle 14 through the bolt 1415. As shown in FIG. 12, the strap hole 1414 of the baffle 14 may be used with the strap 1416 to achieve the fixed connection between the first wall 1101 of the first compartment 110 and the baffle 14.

It should be understood that in this embodiment of this application, the compartment wall 113 of the first compartment 110 may be referred to as a side wall of the first compartment 110 facing the interior of the first compartment 110. For example, the compartment wall 113 of the first compartment 110 may be the first wall 1101. In an example, this embodiment of this application is not limited thereto. It should also be understood that in some embodiments, the baffle 14 may be connected to a horizontal beam or vertical beam in the first compartment 110. In this embodiment of this application, the horizontal beam or vertical beam may be at least part of the compartment wall 113 of the first compartment 110.

In this way, in this embodiment, when the baffle 14 and the compartment wall 113 of the first compartment 110 are connected through a bolt 1415 and/or a strap 1416, the structural stability of the connection between the baffle 14 and the compartment wall 113 of the first compartment 110 can be enhanced. Meanwhile, this connection method is simple and reliable and convenient for disassembly, and can improve the assembly efficiency of the energy storage device 1. In addition, when the baffle 14 and the compartment wall 113 of the first compartment 110 are connected through a strap 1416, because the strap 1416 can provide flexible fixation to some extent, the impact of the processing tolerance of the baffle 14 on the connection between the baffle 14 and the compartment wall 113 of the first compartment 110 can be reduced.

In some embodiments, as shown in FIG. 11, the first end 141 of the baffle 14 may be connected to the first wall 1101 through the strap 1416, and the second end 142 of the baffle 14 may be connected to the second wall 1102 through the bolt 1415. In this way, when the first end 141 of the baffle 14 is connected to the first wall 1101 through the bolt 1415, and the second end 142 of the baffle 14 is connected to the second wall 1102 through the strap 1416, the impact of the processing tolerance of the baffle 14 or the energy storage device 1 on the connection between the baffle 14 and the first wall 1101 and the second wall 1102 can be effectively reduced. In addition, this connection method is simple and reliable and convenient for disassembly, and can improve the assembly efficiency of the energy storage device 1. In some other embodiments, the first end 141 of the baffle 14 may alternatively be connected to the first wall 1101 through the bolt 1415, and the second end 142 of the baffle 14 may be connected to the second wall 1102 through the strap 1416.

In some embodiments, as shown in FIG. 11 and FIG. 12, a first limiting member 15 is provided on a compartment wall 113 of the first compartment 110, and the first limiting member 15 is located below the baffle 14 for supporting the baffle 14. In this way, in this embodiment, the first limiting member 15 is arranged below the baffle 14, and the first limiting member 15 is used for supporting the baffle 14, which can further enhance the relative position stability of the baffle 14 within the first compartment 110 and facilitates the installation and fixation between the baffle 14 and the compartment wall 113.

It should be understood that in this embodiment of this application, a quantity of first limiting members 15 may be set according to actual needs. For example, two first limiting members 15 may be arranged. In an example, this embodiment of this application is not limited thereto.

In some implementations, as shown in FIG. 11 and FIG. 12, a first limiting member 15 is provided on the first wall 1101 and/or the second wall 1102, and the first limiting member 15 is located below the baffle 14 for supporting the baffle 14. In this way, compared to the solution of providing the first limiting member 15 on each of four walls of the first compartment 110, the first limiting member 15 is arranged on the first wall 1101 and/or the second wall 1102 of the first compartment 110, which can ensure the structural stability of the connection between the baffle 14 and the first compartment 110 while reducing the processing cost of the energy storage device 1.

In some embodiments, as shown in FIG. 12, a second limiting member 16 is further provided on the compartment wall 113 of the first compartment 110, and the second limiting member 16 is located above the baffle 14. It should be understood that in this embodiment of this application, the second limiting member 16 being located above the baffle 14 means that the second limiting member 16 may be located above an edge of one end of the baffle 14 to limit the movement of the baffle 14 in the height direction of the energy storage device 1. It should also be understood that the second limiting member 16 may be in direct contact with the baffle 14, or the second limiting member 16 may be at a certain distance from the baffle 14. In an example, this embodiment of this application is not limited thereto.

In this way, in this embodiment of this application, the second limiting member 16 is arranged on the compartment wall 113 of the first compartment 110, and the second limiting member 16 is located above the baffle 14, for example, the second limiting member 16 may be located above an edge of one end of the baffle 14 to limit the displacement of the baffle 14 in the height direction of the energy storage device 1, which can further enhance the relative position stability of the baffle 14 within the first compartment 110.

In some embodiments, as shown in FIG. 12, the first limiting member 15 includes a first portion 151 and a second portion 152 that are connected to each other, where the first portion 151 is connected to the first wall 1101 or the second wall 1102, and the first wall 1101 and the second wall 1102 are two walls of the first compartment 110 that face each other in the horizontal direction; and the second limiting member 16 includes a third portion 161 and a fourth portion 162 that are connected to each other, where the third portion 161 is connected to the first wall 1101 or the second wall 1102, and the second portion 152 and the fourth portion 162 both extend toward the inside of the first compartment 110. In this way, in this embodiment of this application, the first limiting member 15 includes the first portion 151 connected to the first wall 1101 or the second wall 1102 and the second portion 152 extending toward the inside of the first compartment 110. The second limiting member 16 includes the third portion 161 connected to the first wall 1101 or the second wall 1102 and the fourth portion 162 extending toward the inside of the first compartment 110, in other words, the baffle 14 is supported by the second portion 152 and the fourth portion 162, which enhances the relative position stability of the baffle 14 within the first compartment 110. Furthermore, the first limiting member 15 and the second limiting member 16 have simple structures and are easy to process, which can improve the assembly rate of the energy storage device 1.

It should also be understood that in this embodiment of this application, the first limiting member 15 may be multiple first limiting members 15, in other words, the energy storage device 1 in this embodiment of this application may be provided with multiple first limiting members 15. The second limiting member 16 in this embodiment of this application may be multiple second limiting members 16, in other words, the energy storage device 1 in this embodiment of this application may be provided with multiple second limiting members 16. For example, the energy storage device 1 in this embodiment of this application may be provided with two first limiting members 15 and two second limiting members 16. In an example, this embodiment of this application is not limited thereto.

It should be understood that in this embodiment of this application, the connection of the first portion 151 to the first wall 1101 or the second wall 1102 may mean that when the energy storage device 1 is provided with at least one first limiting member 15, the first portion 151 of the at least one first limiting member 15 is connected to the first wall 1101, or the first portion 151 of the at least one first limiting member is connected to the second wall 1102; or when the energy storage device 1 is provided with multiple first limiting members 15, the first wall 1101 and the second wall 1102 can both be provided with the first limiting member 15, the first portion 151 of the first limiting member 15 arranged on the first wall 1101 is connected to the first wall 1101, and the first portion 151 of the first limiting member 15 arranged on the second wall 1102 is connected to the second wall 1102.

It should also be understood that in this embodiment of this application, the connection of the third portion 161 to the first wall 1101 or the second wall 1102 may mean that when the energy storage device 1 is provided with at least one second limiting member 16, the third portion 161 of the at least one second limiting member 16 is connected to the first wall 1101, or the third portion 161 of the at least one second limiting member 16 is connected to the second wall 1102; or when the energy storage device 1 is provided with multiple second limiting members 16, the first wall 1101 and the second wall 1102 can both be provided with the second limiting member 16, the third portion 161 of the second limiting member 16 arranged on the first wall 1101 is connected to the first wall 1101, and the third portion 161 of the second limiting member 16 arranged on the second wall 1102 is connected to the second wall 1102. It should also be understood that in some embodiments, the first limiting member 15 in this embodiment of this application may be connected to the first wall 1101 and the second limiting member 16 is connected to the second wall 1102; or the first limiting member may be connected to the second wall 1102 and the second limiting member 16 is connected to the first wall 1101. In this case, the first limiting member 15 and the second limiting member 16 may be arranged alternately on the first wall 1101 and the second wall 1102 to support the baffle 14. In some other embodiments, the first limiting member 15 and second limiting member 16 in this embodiment of this application may both be arranged on the first wall 1101, or the first limiting member 15 and the second limiting member 16 may both be arranged on the second wall 1102. In some other embodiments, the first limiting member 15 and second limiting member 16 in this embodiment of this application may both be arranged on the first wall 1101, and the first limiting member 15 and the second limiting member 16 may both be arranged on the second wall 1102. In this case, both the first limiting member 15 and the second limiting member 16 may be arranged on both the first wall 1101 and the second wall 1102. In some other embodiments, when the energy storage device 1 in this embodiment of this application is provided with multiple first limiting members 15, at least one first limiting member 15 may be provided on the first wall 1101 and the second wall 1102; or when the energy storage device 1 is provided with multiple second limiting members 16, at least one second limiting member 16 may be provided on the first wall 1101 and the second wall 1102. In an example, this embodiment of this application is not limited thereto.

It should also be understood that in some embodiments, under the condition that both the first limiting member 15 and the second limiting member 16 are arranged on the first wall 1101 or both the first limiting member 15 and the second limiting member 16 are arranged on the second wall 1102, the second portion 152 of the first limiting member 15 extends from one end of the first portion 151 close to the second limiting member 16 toward the interior of the first compartment 110, and the fourth portion 162 of the second limiting member 16 extends from one end of the third portion 161 close to the first limiting member 15 toward the interior of the first compartment 110.

It should also be understood that in some embodiments, under the condition that both the first limiting member 15 and the second limiting member 16 are arranged on the first wall 1101 or both the first limiting member 15 and the second limiting member 16 are arranged on the second wall 1102, an orthographic projection of the second portion 152 of the first limiting member 15 in the horizontal direction and an orthographic projection of the fourth portion 162 of the second limiting member 16 on the horizontal plane may overlap, partially overlap, or non-overlap. For example, as shown in FIG. 12, the orthographic projection of the second portion 152 of the first limiting member 15 in the horizontal direction and the orthographic projection of the fourth portion 162 of the second limiting member 16 on the horizontal plane overlap each other. In an example, this embodiment of this application is not limited thereto.

In some embodiments, the first limiting member 15 and/or the second limiting member 16 is connected or fixed to a compartment wall 113 of the first compartment 110 through welding, riveting, bolting, or bonding. For example, as shown in FIGS. 11 and 12, the first limiting member 15 includes a first portion 151 and a second portion 152. A side wall of the first portion 151 far from the interior of the energy storage device 1 is welded to the second wall 1102, and the second portion 152 extends toward the interior of the energy storage device 1. In this way, in this embodiment of this application, the first limiting member 15 and/or the second limiting member 16 is fixed to the compartment wall 113 of the first compartment 110 through welding, riveting, bolting, or bonding, which can enhance the structural stability of the connection between the first limiting member 15 and/or the second limiting member 16 and the compartment wall 113 of the first compartment 110. This connection method is simple and reliable, and is conducive to reducing the processing cost of the energy storage device 1.

In some embodiments, as shown in FIG. 2, a water cooling unit 121 or a battery is arranged above the baffle 14. In this way, in this application embodiment, with the baffle 14 arranged above the control box 111 in this embodiment of this application, the adverse impact of impurities such as liquids, pollutants, or dust falling from the water cooling unit 121 or battery above the control box 111 on the control box 111 can be reduced, and the normal operation of the energy storage device 1 can be ensured.

In some embodiments, as shown in FIG. 2, the water cooling unit 121 is arranged above the baffle 14, the energy storage device 1 includes a box 10, and a ventilation apparatus 12 is arranged at a position of the box 10 facing the water cooling unit 121. In this way, in this embodiment of this application, when the water cooling unit 121 is arranged above the baffle 14 and the ventilation apparatus 12 is arranged at the position of the box 10 of the energy storage device 1 that faces the water cooling unit 121, based on the baffle 14 arranged above the control box 111 provided in this embodiment of this application, not only the impact of impurities such as liquids, pollutants, or dust entering the interior of the energy storage device 1 through the ventilation apparatus 12 on the control box 111 can be reduced, but also the impact of emissions from the water cooling unit 121 on the control box 111 can be reduced, ensuring the normal operation of the energy storage device 1.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. An energy storage device, characterized by comprising:
 a control box, arranged in a first compartment of the energy storage device; and
 a baffle, arranged entirely within the first compartment, located above the control box, and covering the control box,
 wherein the baffle comprises a first end and a second end, and the baffle gradually moves away from a bottom of the energy storage device from the entire first end to the entire second end,
 wherein:
 the first compartment comprises a first wall and a second wall that face each other in a horizontal direction, wherein the first end and the second end are respectively directly connected to the first wall and the second wall,
 the control box is a main control box, a control panel is provided on a side of the main control box, the baffle is arranged obliquely, and an end of the baffle distal to the control panel is inclined toward the bottom of the energy storage device,
 the first end and the second end are distributed along a first direction;
 the baffle further includes a third end and a fourth end that are distributed along a second direction, the baffle gradually moving away from the bottom of the energy storage device from the third end to the fourth end, the second direction being perpendicular to the first direction, and
 the baffle is obliquely arranged such that both the first end and the third end are inclined at an angle and both of the first end and the third end gradually move away from the bottom of the energy storage device.

2. The energy storage device according to claim 1, characterized in that the baffle is provided with a drainage port, wherein the drainage port is located at a joint of the first end and the third end.

3. The energy storage device according to claim 2, characterized in that an orthographic projection of the drainage port on a horizontal plane falls outside an orthographic projection of the control box on the horizontal plane.

4. The energy storage device according to claim 2, characterized in that a through hole communicating with the drainage port is provided on a bottom wall of the first compartment.

5. The energy storage device according to claim 1, characterized in that the baffle comprises a main body portion and an extension portion that are connected to each other, wherein the extension portion extends in a direction away from the bottom of the energy storage device.

6. The energy storage device according to claim 5, characterized in that the baffle is arranged obliquely, the baffle comprises the first end and the third end that are close to the bottom of the energy storage device, the extension portion is arranged on both an edge of the first end and an edge of the third end, and the extension portion arranged on the edge of the first end and the extension portion arranged on the edge of the third end are apart from each other to form a drainage port.

7. The energy storage device according to claim 5, characterized in that the main body portion and the extension portion are integrally formed.

8. The energy storage device according to claim 1, characterized in that the baffle is connected to a compartment wall of the first compartment through a bolt and/or a strap.

9. The energy storage device according to claim 1, characterized in that a first limiting member is provided on the compartment wall of the first compartment, and the first limiting member is located below the baffle for supporting the baffle.

10. The energy storage device according to claim 1, characterized in that a first limiting member is provided on the first wall and/or the second wall, and the first limiting member is located below the baffle for supporting the baffle.

11. The energy storage device according to claim 9, characterized in that a second limiting member is further provided on the compartment wall of the first compartment, and the second limiting member is located above the baffle.

12. The energy storage device according to claim 11, characterized in that the first limiting member comprises a first portion and a second portion that are connected to each other, wherein the first portion is connected to the first wall or the second wall, and the first wall and the second wall are two walls of the first compartment that face each other in the horizontal direction; and the second limiting member comprises a third portion and a fourth portion that are connected to each other, wherein the third portion is connected to the first wall or the second wall, and the second portion and the fourth portion both extend toward the inside of the first compartment.

13. The energy storage device according to claim 11, characterized in that the first limiting member and/or the second limiting member is connected or fixed to the compartment wall of the first compartment through welding, riveting, bolting, or bonding.

14. The energy storage device according to claim 1, characterized in that a water cooling unit or a battery is arranged above the baffle.

15. The energy storage device according to claim 14, characterized in that the water cooling unit is arranged above the baffle, the energy storage device comprises a box, and a ventilation apparatus is arranged at a position of the box facing the water cooling unit.

16. The energy storage device according to claim 1, wherein:

the baffle is provided with a drainage port, and the drainage port is located on and at a lower end of the obliquely inclined baffle at a joint of the first end and the third end.

* * * * *